United States Patent [19]
Shelley et al.

[11] Patent Number: 5,743,942
[45] Date of Patent: Apr. 28, 1998

[54] DESICCANT CONTAINER

[75] Inventors: Richard M. Shelley; Matthew Lee Rix, both of Belen, N. Mex.

[73] Assignee: United Catalysts Inc., Belen, N. Mex.

[21] Appl. No.: 715,067

[22] Filed: Sep. 19, 1996

[51] Int. Cl.$^6$ .................................. B01D 53/02
[52] U.S. Cl. .......................... 96/118; 96/154; 206/204; 206/484.1
[58] Field of Search ......................... 55/522, 528; 95/91, 95/117; 96/118, 154; 206/204, 484.1, 524.2

[56] References Cited

U.S. PATENT DOCUMENTS

| | | |
|---|---|---|
| 4,210,686 | 7/1980 | Gajewski et al. . |
| 4,322,465 | 3/1982 | Webster . |
| 4,332,845 | 6/1982 | Nawata, et al. . |
| 4,749,392 | 6/1988 | Aoki et al. ............................... 96/118 |
| 4,769,175 | 9/1988 | Inoue . |
| 4,856,649 | 8/1989 | Inoue . |
| 5,009,308 | 4/1991 | Cullen et al. ............................. 96/154 |
| 5,035,731 | 7/1991 | Spruill et al. . |
| 5,069,694 | 12/1991 | Cullen et al. ............................. 96/154 |
| 5,308,665 | 5/1994 | Sadek et al. ............................ 206/204 |
| 5,538,545 | 7/1996 | Dauber et al. ............................ 96/154 |

*Primary Examiner*—C. Scott Bushey
*Attorney, Agent, or Firm*—Scott R. Cox

[57] ABSTRACT

Formed is a new desiccant film made of an uncoated microporous film secured to an uncoated laminate film wherein the inner surface of both the microporous film and the laminate material are compatible. This film is less expensive to form and produces a stronger bond than conventional coated materials used for desiccant packaging.

12 Claims, 1 Drawing Sheet

DESICCANT CONTAINER

BACKGROUND OF INVENTION

1. Field of Invention.

This invention relates to desiccant containers. More specifically, this invention relates to a desiccant container containing a desiccant material secured within a packaging material wherein the packaging material is multilayered, wherein the layers are uncoated and wherein the inner surfaces of the layers are formed from compatible materials.

2. Prior Art.

Desiccant containers which absorb water vapor, water, liquids and the like are well known in the art. Generally, these containers are comprised of a water or water vapor permeable packaging material formed from fibrous or film products securely sealed together at the edges of the packaging. The packaging material encapsulates a desiccant material, such as silica gel. The volume of water or water vapor absorbed by the desiccant container is generally determined by the absorbent capacity of the desiccant material contained within the container.

One type of desiccant container absorbs both water vapor and liquid water by permitting both to pass through the packaging material to be absorbed by the desiccant material. In some circumstances, the packaging material for this type of product dissolves to permit the desiccant material contained within the desiccant container to have direct contact with the liquid. This type of product is disclosed, for example, in U.S. Pat. Nos. 4,749,600, 4,725,464, 4,224,366, 4,853,266, 4,748,069 and EPO 562,846, One disadvantage of this type of liquid absorbing desiccant container is that once the packaging material dissolves, liquid water which is initially absorbed by the desiccant material may escape from the desiccant container to contact the environment surrounding the desiccant container.

Another type of desiccant container absorbs water vapor but not liquid water. The packaging material for this type of desiccant container is designed to prevent water absorbed within the desiccant container as water vapor from being released from the desiccant container in the form of liquid water. This type of desiccant container is especially useful during transportation of products over long distances. This type of desiccant container is frequently used among metal storage containers which hold products being shipped. In this use, the desiccant container must absorb water vapor without releasing liquid water from the container. Any release of water might result in rusting of the associated metal storage containers. Even though many current desiccant containers are "designed" not to leak, because of the composition of the packaging material, leaks often occur resulting in rusting of the storage containers.

In addition to the problems associated with producing a desiccant container which does not release liquid water after absorption of water vapor, it is also important that the packaging materials used to encapsulate the desiccant product be inexpensive. Further, the packaging material for such desiccant containers should also be simple to produce and capable of manufacture using high speed production facilities.

Current desiccant containers are usually formed of film laminates which are sealed using heater seal bars. These conventional multipurpose film materials are generally coated, with an adhesive normally on the seal side. As a result, the strength of the packaging material for the desiccant container is dependent on the strength of the adhesive seal between the layers of the film laminate.

The packaging material for desiccant containers must also be microporous so that water vapor can pass through the packaging material to be absorbed by the desiccant material. Conventional desiccant packaging utilizes a microporous layer or layers laminated to a vapor-permeable polyolefinic material where the vapor permeable layer is different in structure than the microporous layer. This second layer provides additional strength and stability for the desiccant packaging material. Strength and stability for the desiccant packaging is good if two similar microporous layers are sealed together but this usually requires special equipment such as impulse sealers which are slow in operation. Because of this difference in structure, it is often difficult to heat seal the microporous film to the second layer by conventional melt sealing equipment because of the differences in the softening points of the two layers. When two layers of a conventional packaging material are sealed by softening the inside portions of each layer, the softened film tends to adhere to the heat seal bars or heat rolls of the sealing machine. Under these circumstances a special heat-sealer is often necessary, such as an impulse heat-sealer, in order to heat seal these differing layers. When such a heat-sealer is used in an automatic packaging machine, the automatic packaging machine operates slower than conventional heat sealing equipment. Further, the laminated film that is formed frequently is not strongly sealed. In addition, the cost of coated types of films which are often used to form these desiccant containers is higher than uncoated films.

Laminated films have been utilized for various types of containers wherein the composition of the layers of the laminated film are different. For example, U.S. Pat. No. 4,332,845 discloses a bag used to encapsulate an oxygen absorbent, wherein the bag is composed of a laminated sheet comprising a microporous film and one or more gas permeable sheets laminated to one or both sides of the microporous film. The film is selected from a number of conventional films including, for example, Celgard® (manufactured by Celanese Corporation) and Tyvek® (manufactured by E. I. DuPont). The lamination process utilizes a low melting temperature adhesive secured to the inside surface of a microporous material to laminate the microporous film to the gas permeable layer. Alternatively, a portion of the gas permeable sheet can be melted to secure it to the microporous layer.

U.S. Pat. No. 4,856,649 discloses a deodorizer parcel formed from a composite sheet packaging material composed of a gas permeable sheet, such as a sheet of paper or nonwoven cloth, laminated onto several layers of a plastic film. The plastic films that are laminated to the paper may comprise a laminate themselves comprised of a plastic film with a high softening point secured to a plastic film with a low softening point. The surface of the plastic film laminated to the gas permeable sheet is composed of a different material than the gas permeable sheet.

U.S. Pat. No. 4,322,465 discloses a sealed, parenteral container for containing a parenteral solution. The packaging material for the parenteral container is a water vapor barrier material which includes a first plastic sheet, a second plastic sheet and a metal sheet wherein the first and second plastic sheets are preferably comprised of a polypropylene.

U.S. Pat. No. 4,210,686 discloses a multilayered plastic sheeting material which is resistant to water vapor transmission. The first layer is comprised of a block copolymer and a polystyrene secured to a polyolefinic second layer.

U.S. Pat. No. 4,769,175 discloses an oxygen scavenger for preserving foods or other articles in an oxygen-free environment, wherein the packaging may consist of a nonwoven fabric or microporous film laminated to various plastic films. The composition of each side of the laminate may consist of a number of different polymers including polypropylene, polyethylene and polyethylene terephthalate.

Finally, U.S. Pat. No. 5,035,731 discloses a moisture absorbent insert for use in a cigarette container. The membrane surrounding the absorbent material consists of a microporous membrane such as Celgard® or a cellulose triacetate.

While these references disclose multilayered packaging materials, some of which are used with desiccant materials, there are still significant problems in the production of a packaging material for desiccant containers and their use with specific types of desiccant materials. During the production of conventional laminated packaging materials, at least one side of the packaging material is generally coated with an adhesive. This adhesive is heated to bind the two layers together. Because of this adhesive, it is difficult for the equipment utilized to form the desiccant packaging to work at peak capacity. Weak seals which are frequently formed using this equipment often result in significant down time for the equipment. In addition, films laminated with adhesives do not form a strong bond between the layers, which is desirable for desiccant packaging. In addition, because coated films are more expensive than uncoated films, packaging material formed using coated films tends to be more expensive than laminated films formed from uncoated films.

Therefore it is an object of the invention to disclose a desiccant container containing a desiccant material encapsulated by a laminated, water vapor permeable desiccant packaging material formed using conventional form-fill sealing equipment.

It is a further object of the invention to disclose a desiccant container formed from a laminated, water vapor permeable desiccant packaging material which exhibits great strength and is less costly to produce than conventional desiccant packaging material.

It is a further object of the invention to disclose a desiccant container formed from a laminated, water vapor permeable desiccant packaging material, wherein the inside surfaces of facing layers of the laminate are formed from compatible materials.

It is a still further object of the invention to disclose a desiccant container formed from a laminated, water vapor permeable desiccant packaging material comprising an uncoated microporous or nonwoven film layer secured to an uncoated laminated film, wherein the inner layers of the microporous film and the laminate film are composed of compatible material.

It is a still further object of the invention to disclose a desiccant container formed from a laminated, water vapor permeable desiccant packaging material wherein the desiccant material contained within the packaging material is a combination of calcium chloride and starch, preferably a modified starch.

These and other objects and features of the present invention will become apparent to those skilled in the art from a consideration of the following detailed description, drawings and claims. The description, along with the accompanying drawings, provides a selected example of the construction of the product and process to illustrate the invention.

SUMMARY OF INVENTION

In accordance with the present invention there is provided a desiccant container for absorbing water vapor without releasing water from the container comprising a desiccant material encapsulated by a laminated, water vapor permeable desiccant packaging material, wherein said packaging material comprises an uncoated microporous or nonwoven film, heat sealed to an uncoated laminate film, wherein the uncoated microporous or nonwoven film is produced from a different composition than the uncoated laminate film, wherein the inner surface of the uncoated microporous or nonwoven film is sealed to the inner surface of the uncoated laminate film, and wherein the inner surface of the uncoated microporous or nonwoven film and the inner surface of the uncoated laminate film are comprised of compatible polymeric materials. The desiccating material utilized with this desiccant container may be a conventional desiccant material but, preferably, it is comprised of a combination of calcium chloride and starch, preferably modified corn starch.

In addition, there is disclosed a process for forming a desiccant container for absorbing and immobilizing water vapor without releasing water from the desiccant container comprising (a) forming an uncoated microporous or nonwoven film having an inner and outer surface, (b) forming an uncoated, water vapor permeable laminated film having an inner and outer surface, wherein the uncoated microporous or nonwoven film comprises a different composition than the uncoated laminated film and wherein the inner surface of the uncoated microporous or nonwoven film is compatible with the inner surface of the uncoated laminated film, (c) sealing most of the edges of the inner surface of the microporous film to the edges of the inner surface of the uncoated laminated film to form a desiccant packaging sheet, (d) filling the desiccant package with a desiccating material, preferably a mixture of calcium chloride and starch, and (e) sealing the remaining unsealed edges of the package to form the desiccant container.

BRIEF DESCRIPTION OF THE DRAWINGS

This invention will now be described with reference to the accompanying drawings in which.

DETAILED DESCRIPTION OF THE PREFERRED EMBODIMENT

Figure 1:
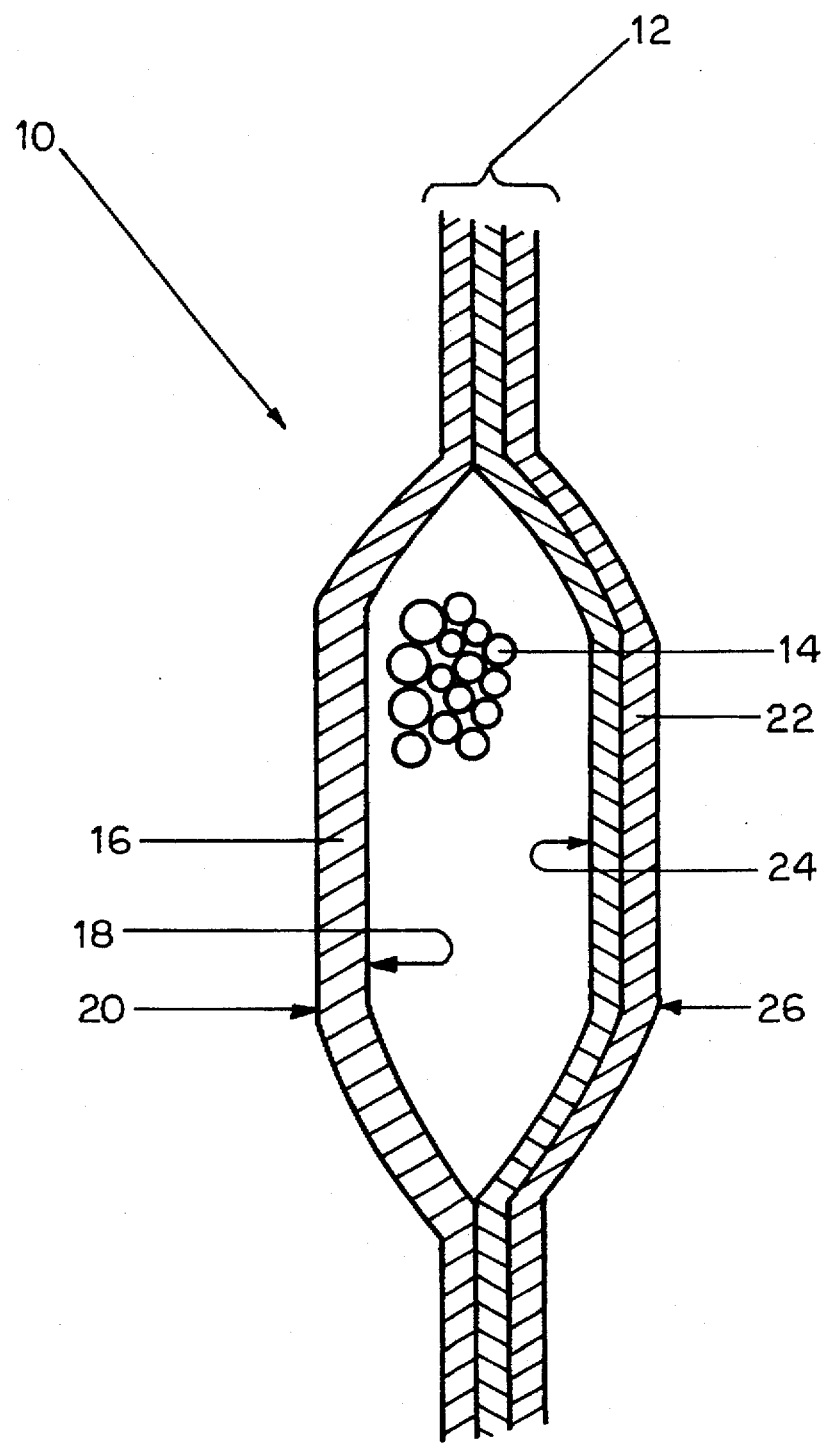
FIG. 1 is a perspective view of the desiccant container.

Although the invention is adaptable to a wide variety of uses, it is shown in the drawings for the purpose of illustration as embodied in a desiccant container (10) for absorbing and immobilizing a liquid comprised of a desiccant packaging material (12) encapsulating a liquid absorbing and immobilizing desiccant material (14). See FIG. 1.

The desiccant packaging material (12) comprises a laminated film layer (16) with an inner (18) and outer (20) surface preferably formed from an uncoated microporous or nonwoven film layer sealed to an uncoated, water vapor permeable laminate film (22) with an inner (24) and outer (26) surface. The inner surface of the layers are sealed at the edges as shown in FIG. 1.

Conventional microporous or nonwoven films used for the manufacture of a laminated packaging material have been formed into a composite film bonded to another layer of material. Conventionally, the bonding of the two layers is accomplished by the use of an adhesive which coats one or both of the inside surfaces of the layers. It has been surprisingly discovered that strong, laminated desiccant packaging materials can be produced from uncoated microporous or nonwoven films.

The uncoated microporous or nonwoven film (16) comprises a film having a plurality of fine openings, which film is gas permeable, but water impermeable when there is no difference between the air pressure outside of the film and inside of the film. The size of the openings is preferably in the range of about 0.01 to 50 microns. The uncoated microporous or nonwoven film may constitute a single film layer or may comprise a laminate of separate microporous film layers. Preferably the film is a single layer microporous film formed from a polyolefinic material, such as polyethylene, polypropylene, poly(fluorinated ethylene), ethylene vinyl acetate, ethylene acrylic ester and the like. The uncoated microporous or nonwoven film may be prepared by any conventional film forming process including cold orientation of the film, orientation of different substance-containing films, extraction of different substances from different substance-containing films, extraction of different substance-containing film followed by orientation of the treated film, cross-dispersing of a bundle of fibers followed by heat-pressing the resulting film and any other conventional procedures utilized for the formation of a microporous film. Many such microporous films are commercially available and are sold, for example, under the name Celgard® (Hoechst Celanese Corporation), GORE-TEX® (Gore & Co. Gmbh) and Tyvek® (E. I. DuPont). The preferred microporous film has a Gurley-type air permeability of about 0.01 to 10,000 sec./100 millimeters, preferably 1 to 1,000 second/100 millimeters and most preferably less than about 400 seconds/100 millimeters. Preferably, the microporous film is a polyethylene or polypropylene-based microporous film and most preferably a polyethylene spunbonded paper such as Tyvek® 1059B or 1037B manufactured by E. I. DuPont, or a polypropylene based film, such as GDT II manufactured by San Ai, Ltd. of Osaka, Japan.

The second layer of the desiccant packaging material is preferably formed from the uncoated laminate film (22). The laminate film can be formed of conventional polymeric materials. The critical aspect of the composition of the laminate film is that its inner surface (24), which is bonded to the inner surface (18) of the uncoated microporous or nonwoven film layer at the edges of the packaging material, must be comprised of materials which are compatible with the composition of the inner surface of the microporous or nonwoven film layer. Materials that can be used to form this laminate film include conventional polyolefinic materials such as polyolefinic polypropylene, polyolefinic polyethylene, polyesters and the like. Preferably, the uncoated laminate film has a lower moisture vapor transmission rate than the microporous or nonwoven film. Also preferably the softening temperature of the uncoated laminate film is lower than or equal to the softening temperature of the inner surface of the uncoated microporous film. Preferably the laminate film is comprised of a laminated film comprising a high melting or softening point material, such as polyester, located on one side laminated to a lower melting point material, such as polypropylene on the opposite side. Examples of acceptable laminate film include, for example, RPP91-1964 or RPP1007a manufactured by Roll-Print.

The outer surface (26) of the laminate film are preferably formed from materials which are incompatible with the microporous layer, such as materials having a higher melting or softening point than that of the inner surface of the microporous film, such as polyester material. In contrast, the inner surface of the laminate film (24) must be formed from a material which is compatible with the inner surface (18) of the microporous film. By having the two inner surfaces formed from compatible materials, a strong bond is formed between those layers when they are heat sealed together. "Compatible" means that the materials mix on a molecular scale and will crystallize homogeneously. Thus, while such layers may not have precisely the same softening point, they should have softening points which are consistent, so that the materials will mix on a molecular level. Compatible bonds generally have a bond strength of at least about 5 lb./in. or more. For example, the compatible materials may include high density, low density, or linear density polyethylenes as well as nonoriented, bi-axially oriented or laminated polypropylenes. In contrast, the outer surface of at least the laminate film should be manufactured from incompatible materials such as polyester or nylon or a polyethylene or polypropylene material with a higher softening point than the inner surface of the laminate film material.

In addition, it is also critical that the inner surface of both the laminate film and the microporous or nonwoven film be uncoated with an adhesive. Coated film, when sealed to other coated or uncoated films, frequently form poor quality, weak seals. In addition, the sealing machines used for sealing coated films are also more expensive and more difficult to operate, resulting in greater expense for the manufacture of sealing coated films. Further, uncoated films are generally less expensive than coated films, sometimes by as much as 50 percent.

Suitable materials for use as the desiccant material to be incorporated into the desiccant packages include conventional desiccating material such as silica gel, clays, calcium chloride, alkali metal carboxylate salts of starch—polyacrylonitrile and other products that absorb, gel or thicken upon contact with water or water vapor, such as sodium polyacrylate. However, it has been surprisingly discovered that the preferred desiccant material is a mixture of calcium chloride and starch, preferably a modified starch, such as MIRA-SPERSE® 623, 626 and 629 produced by Staley Food Products. The composition of this desiccant material is preferably about 20 to about 90 percent calcium chloride mixed with about 80 to about 10 percent starch. More preferably, the calcium chloride comprises about 50 to about 80 percent while the starch comprises about 50 to about 20 percent of the composition.

The process for the formation of the desiccating container comprises a number of steps. The desiccant packaging material is first formed. To form the desiccant packaging material of the instant invention, the uncoated microporous and nonwoven film (16) is first formed or acquired from conventional sources. In a preferred embodiment the microporous film is an uncoated microporous or non-woven film such as Celgard® produced Hoechst Celanese Corporation, Tyvek® Nos. 1059B and 1073B produced by E. I. DuPont or certain other polypropylene-based nonwoven films such as GDTI, II produced by San Ai of Osaka, Japan. As stated above, the permeability of this microporous film should be in the range of about 1 to about 1,000 Gurley seconds per 100 millimeters and preferably less than about 400 seconds per 100 millimeters.

Following the formation of the uncoated microporous or nonwoven film, the uncoated laminate film (22) is formed. As stated above, this uncoated laminate film can be comprised of different layers of the same or different materials laminated together. However, the critical element of the composition of this material is that the film must be uncoated and the inner surface (24) of the laminate film, which is sealed to an inner surface (18) of the microporous material, must be formed of a material which is "compatible" with the inner surface of the uncoated microporous or nonwoven film. In one preferred embodiment, the laminate film is a laminated film containing a polyester material on the outer surface with a polypropylene material on the inner surface, such as RPP 91-1964 made by RollPrint. Another preferred embodiment is RPP 31-1007A, a polyethylene-based material also manufactured by RollPrint.

Following the formation of the two layers, the edges of the layers are sealed together by a conventional heat sealing procedure. One of the advantages of the product formed from the instant invention is that the bond formed between the two compatible, uncoated materials has a significantly greater strength than conventional bonds utilizing an adhesive coating. By utilizing the capability of compatible materials to form a strong seal without using an adhesive, the strength of the desiccant packaging material is significantly increased over conventional packaging materials. In addition, these uncoated materials have a lower cost of production and run better through the sealing equipment.

The preferred desiccant material is then placed within the desiccant packaging. By using the preferred desiccant material (14) formed from calcium chloride and starch, preferably a modified starch, lesser quantities of the desiccating material need be utilized than for conventional desiccating containers and still achieve the same amount of moisture absorbency.

Following the addition of the desiccant material to the desiccant packaging material, the remaining unsealed edges of the desiccant container are sealed to complete the formation of the desiccant container.

EXAMPLES

Example 1

A microporous film manufactured by San Ai, of Osaka, Japan, known as GDTII, was sealed to a laminate film, RPP 32-2011 manufactured by RollPrint. Neither film was coated with an adhesive. The inner surface of both layers was compatible as they are both polyethylene materials. The edges of the inner surfaces of the materials were sealed together by heated seal bars, where both front and back bars are heated to 350° F. Following the formation of this seal, the strength of the seal was tested, using an Instron tensile strength tester on an inch wide strip of the material. The average seal strength in pounds force per square inch was 9.38 lb/in$^2$.

Example 2

An uncoated polyethylene-based spun bonded microporous material, Tyvek® 1059B manufactured by DuPont, was sealed to RPP 31-1071 manufactured by Roll-Print. The inner surfaces of these two layers were compatible because they were both polyethylene materials. Neither of these films were coated with an adhesive. The edges of the inner surfaces of the two films were sealed together by use of heated seal bars with both front and back heated at a temperature of 350° F. Following the formation of this sealed laminated film, the strength of the seal was tested using the procedure described in Example 1. The average seal strength was 10.21 lb./in$^2$.

Example 3—Comparative Example

To compare the strength of the seals made with coated materials, the following composite film was produced: the edge of a Desiview® MP-20 film, manufactured by Wraps, Inc. of East Orange NJ, was sealed to the edges of a Tyvek® 1059 material manufactured by DuPont and coated by Oliver Products of Grand Rapids, Mich. with a 10 DP adhesive coating. The two layers were sealed by use of heat seal bars. The surfaces which were sealed together were incompatible as the inner surface of the Desiview® film was comprised of polyester polyolefin while the Tyvek® 1059 was a spun-bound, polyethylene material. The strength of the seal was computed based on the test described in Example 1. The average strength of the seal was 2.77 lb/in$^2$.

As is clear from these examples, desiccant packaging materials formed from an uncoated microporous film sealed to an uncoated film laminate where the inner surfaces of the films comprise compatible materials are superior in performance over conventionally formed desiccant packages sealed using an adhesive coating. Not only is the strength of the seal between the two layers at least as strong and generally stronger than that produced from coated materials, but the price of the uncoated materials is significantly less. In addition, because none of the layers of the packaging material are coated, the packaging material can be formed using conventional sealing equipment, such as resistance heated seal bars running at peak efficiency. When the preferred desiccant material is utilized, these desiccant packages also have water vapor absorption capabilities at least as good as conventional desiccant packages formed from coated microporous and laminated films.

We claim:

1. A desiccant container comprising
   a desiccant material surrounded by a laminated, water vapor permeable desiccant packaging material, wherein said packaging material comprises an uncoated microporous film having an inner and outer surface heat sealed to an uncoated laminate film having an inner and outer surface, wherein the uncoated microporous film comprises a different composition from the uncoated laminate film, wherein edges of the inner surface of the uncoated microporous film are sealed to edges of the inner surface of the uncoated laminate film, and wherein the inner surface of the uncoated microporous film and the inner surface of the uncoated laminate film are comprised of compatible polymeric materials.

2. The desiccant container of claim 1 wherein the uncoated laminate film has a lower moisture vapor transmission rate than the microporous film.

3. The desiccant container of claim 1 wherein the microporous film has an air permeability of less than about 400 Gurley seconds/100 ml.

4. The desiccant container of claim 1 wherein the uncoated microporous film is produced from a polyethylene or polypropylene polyolefin material.

5. The desiccant container of claim 1 wherein the inner surface of the uncoated microporous film of the desiccant packaging material comprises a water vapor permeable, uncoated polyolefinic polyethylene material.

6. The desiccant container of claim 1 wherein the inner surface of the uncoated microporous film of the desiccant packaging material comprises a water vapor permeable, uncoated polyolefinic polypropylene material.

7. The desiccant container of claim 1 wherein the inner surface of the uncoated laminate film comprises a water vapor permeable uncoated polyolefinic polyethylene compatible material.

8. The desiccant container of claim 1 wherein the inner surface of the uncoated laminate film comprises a water vapor permeable uncoated polyolefinic polypropylene compatible material.

9. The desiccant container of claim 1 wherein the inner surface of the uncoated microporous film and the inner surface of the uncoated laminate film comprise water permeable uncoated polyolefinic polyethylene compatible material.

10. The desiccant container of claim 1 wherein the inner surface of the uncoated microporous or nonwoven film and the inner surface of the uncoated laminate film comprise water permeable uncoated polyolefinic polypropylene compatible material.

11. The desiccant container of claim 1 wherein the softening temperature of the inner surface of the uncoated laminate film is lower than or equal to the softening temperature of the inner surface of the uncoated microporous film.

12. The desiccant container of claim 1 wherein the outer layer of the uncoated laminate film comprises a polyester or nylon or polymer with a softening range higher than the inner surface of the laminate film material.

* * * * *